(12) United States Patent
Brack et al.

(10) Patent No.: US 7,858,728 B2
(45) Date of Patent: Dec. 28, 2010

(54) POLYCARBONATE RESINS METHOD OF MANUFACTURE, AND ARTICLES FORMED THEREFROM

(75) Inventors: Hans-Peter Brack, Herrliberg (CH); Bernard Jansen, Bergen op Zoom (NL); Jan Henk Kamps, Bergen Op Zoom (NL); Hans Looij, Bergen op Zoom (NL); Han Vermeulen, Hoeven (NL); Dennis Willemse, Standdaarbuiten (NL)

(73) Assignee: SABIC Innovative Plastics IP B.V. (NL)

( * ) Notice: Subject to any disclaimer, the term of this patent is extended or adjusted under 35 U.S.C. 154(b) by 185 days.

(21) Appl. No.: 11/875,275

(22) Filed: Oct. 19, 2007

(65) Prior Publication Data

US 2009/0105438 A1 Apr. 23, 2009

(51) Int. Cl.
*C08G 64/00* (2006.01)
*C08G 63/02* (2006.01)
(52) U.S. Cl. .................. 528/198; 526/314; 528/176; 528/190; 528/193; 528/196
(58) Field of Classification Search ............ 526/314; 528/176, 190, 193, 196, 198
See application file for complete search history.

(56) References Cited

U.S. PATENT DOCUMENTS

| | | | |
|---|---|---|---|
| 4,506,066 A | 3/1985 | Medem et al. | |
| 4,518,747 A | 5/1985 | Stix et al. | |
| 5,358,978 A | 10/1994 | Plotkin et al. | |
| 5,362,838 A | 11/1994 | McGrath et al. | |
| 7,138,479 B2 | 11/2006 | Dhara et al. | |
| 2006/0002814 A1* | 1/2006 | Chatterjee et al. | 422/26 |
| 2006/0149024 A1 | 7/2006 | Ono et al. | |
| 2006/0182984 A1* | 8/2006 | Abele et al. | 428/500 |
| 2008/0269386 A1* | 10/2008 | Chakravarti et al. | 524/147 |
| 2009/0105393 A1* | 4/2009 | Jansen et al. | 524/502 |
| 2009/0105443 A1* | 4/2009 | Brack et al. | 528/190 |

FOREIGN PATENT DOCUMENTS

| | | | |
|---|---|---|---|
| EP | 0866083 | | 9/1998 |
| GB | 1079686 | | 8/1967 |
| JP | 09249717 | * | 9/1997 |
| JP | 2005132872 | * | 5/2005 |

OTHER PUBLICATIONS

Braun, et al. Polyesters with 1.4:3.8-dianhydrosobritol as polymeric plasticizers for PVC, Die Angewandte Makromolekulare Chemie, 1992, p. 191-205, vol. 199, Huthig & Wepf Verlag, Basel.
Kricheldorf, et al., Polymers of Carbonic Acid. 22. Cholesteric Polycarbonates Derived from (S)-((2-Methylbutyl)thio)hydroquinone or Isosorbide, Macromolecules 29, 1996, p. 8077-8082, vol. 29, American Chemical Society.
JP61306398, Published Jul. 2, 1988, Abstract Only, 1 page.
JP05176418, Published Jan. 27, 1995, Abstract Only, 1 page.
EP0187248, Published Jul. 16, 1986, Abstract Only. 1 page.
PCT International Search Report for International Application No. PCT/IB2008/054287.

* cited by examiner

*Primary Examiner*—Terressa M Boykin
(74) *Attorney, Agent, or Firm*—Cantor Colburn LLP

(57) ABSTRACT

Disclosed herein is a polycarbonate comprising a terminal olefin group of the formula

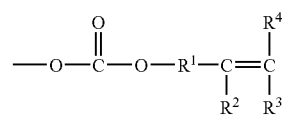

wherein $R^1$ is a $C_1$-$C_{40}$ hydrocarbon that can be unsubstituted or substituted with a halogen, olefin, ether, ketone, or $C_4$-$C_{30}$ polyoxyalkylene functionality in which the alkylene groups contain 2 to 6 carbon atoms, $R^2$ to $R^4$ are each independently a hydrogen or a $C_1$-$C_{40}$ hydrocarbon that can be unsubstituted or substituted with a halogen, olefin, ether, ketone, or a $C_4$-$C_{30}$ polyoxyalkylene functionality in which the alkylene groups contain 2 to 6 carbon atoms, and optionally wherein any two of $R^1$ to $R^4$ together form a monocyclic, bicyclic, or tricyclic ring system optionally substituted with a heteroatom in each ring.

32 Claims, 5 Drawing Sheets

1H-NMR    2D-COSY

POLYCARBONATE RESINS METHOD OF MANUFACTURE, AND ARTICLES FORMED THEREFROM

BACKGROUND OF THE INVENTION

This disclosure relates to polycarbonates, their methods of manufacture, and articles formed therefrom.

Polycarbonates are engineering thermoplastics used in the manufacture of articles for a wide variety of applications, included automotive to electrical to construction. Because of their wide industrial applicability, there is a continuing interest in the manufacture of novel polycarbonates, in particular polycarbonates that can be readily modified to provide different properties. One approach to obtaining such polycarbonates has been to incorporate double bond (olefin) functionality One approach to incorporating olefin functionality in polycarbonates uses olefin-containing monomers or chainstoppers in low-temperature interfacial polymerization processes. Drawbacks of this approach include the relatively high cost and lack of commercial availability of the unsaturated monomers or chainstoppers. In addition, use of interfacial polymerization processes adds additional cost and complexity when incorporating such olefin-containing monomers and chainstoppers into polycarbonates prepared by the melt transesterification method.

Accordingly, there remains a need for polycarbonates containing olefin functionality, an in particular methods for preparing such polycarbonates. It would be particularly advantageous if such methods used low cost materials that are readily commercially available.

BRIEF SUMMARY OF THE INVENTION

The above-described and other deficiencies of the art are overcome by a polycarbonate comprising a terminal olefin group of the formula

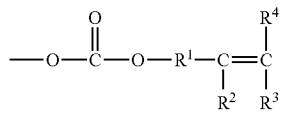

wherein $R^1$ is a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, $R^2$ to $R^4$ are each independently a hydrogen or a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, and optionally wherein any two of $R^1$ to $R^4$ together form a monocyclic, bicyclic, or tricyclic ring system optionally substituted with an oxygen in one or more of the rings.

In an alternative embodiment, a polycarbonate comprises a group of the formula

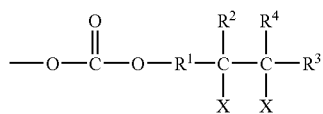

wherein $R^1$ is a $C_1$-$C_{40}$ hydrocarbon that can be unsubstituted or substituted with a halogen, olefin, ether, ketone, or $C_4$-$C_{30}$ polyoxyalkylene functionality in which the alkylene groups contain 2 to 6 carbon atoms, $R^2$ to $R^4$ are each independently a hydrogen or a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, optionally wherein any two of $R^1$ to $R^4$ together form a monocyclic, bicyclic, or tricyclic ring system optionally substituted with a heteroatom in one or more of the rings; and each X is independently a hydrogen, a polymer, an oligomer, a compatibilizer, a crosslinker, an ultraviolet light stabilizer, a thermal stabilizer, a mold release agent, a gamma-stabilizer, a flame retardant, or an antioxidant.

Further disclosed is an article comprising the above-described compositions.

A method of manufacture of the articles comprises molding, or extruding the above-described compositions.

Also disclosed is a method for the manufacture of an olefin group-terminated polycarbonate, the method comprising melt-reacting a polycarbonate and a hydroxy compound of the formula

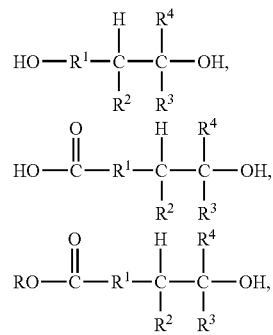

or a combination comprising at least one of the foregoing compounds, wherein $R^1$ is a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, $R^2$ to $R^4$ are each independently a hydrogen or a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, R is a $C_{1-22}$ hydrocarbon, and optionally wherein any two of $R^1$ to $R^4$ together form a monocyclic, bicyclic, or tricyclic ring system optionally substituted with a heteroatom in one or more of the rings, at a temperature and for a time effective to form the olefin group-terminated polycarbonate.

The above described and other features are exemplified by the following figures and detailed description.

DETAILED DESCRIPTION OF THE INVENTION

Figure 1:
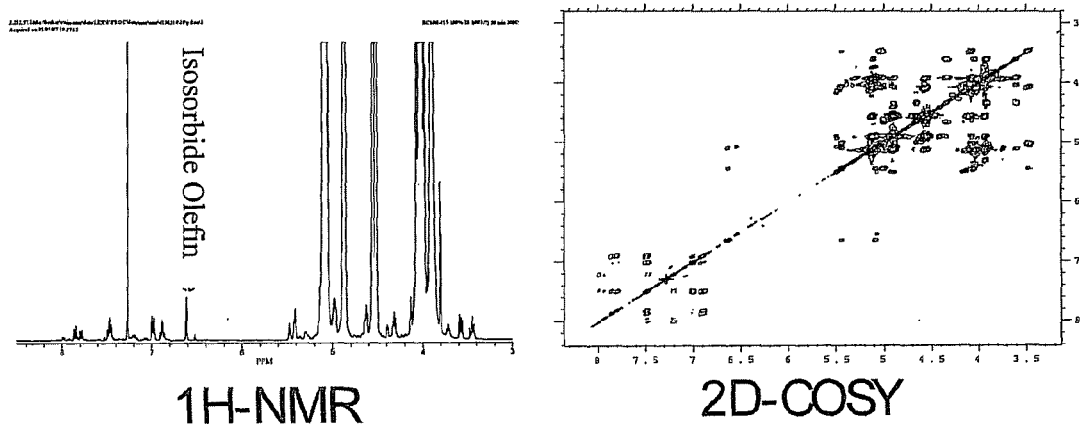
FIG. 1 is shows an $^1$H NMR spectra of an isosorbide polycarbonate homopolymer synthesized and subjected to extended melt mixing according to Example 1.

Described herein are polycarbonates and polyester-polycarbonates having terminal groups that contain a reactive olefin. Surprisingly, it has been discovered that these polymers can be manufactured by melt mixing a polycarbonate with a primary, secondary, or tertiary hydroxy compound having a beta-hydrogen. In a particularly advantageous embodiment, it has been found that the high temperature, reactive melt mixing can be accomplished during or after manufacture of the polycarbonate in a melt extrusion process. In fact, it has been found that the large physical size, long residence times, and high temperatures associated with commercial-scale processes facilitate the production of the olefin-derivatized polycarbonates. Unexpectedly, the process results in selective incorporation of the olefin groups at the chain termini, without significantly affecting the polydispersity of the polycarbonates.

Another advantage of the process is that many primary, secondary, and tertiary hydroxy compounds having a beta-hydrogen are readily commercially available, and in the case of diols such as isosorbide, can be biosourced. The disclosed processes can therefore provide polycarbonates with terminal olefin groups at a lower cost than processes that use more costly vinyl-containing chainstoppers or monomers. Moreover, melt processes can provide the polycarbonates at a lower cost than methods that use interfacial polymerization processes. The disclosed melt process is also less complex than interfacial polymerization, and olefin incorporation can be controlled by control of reactor parameters such as reactor temperature, residence time, and catalyst concentration.

As used herein, the term "polycarbonate" includes homopolycarbonates and copolycarbonates have repeating structural carbonate units of the formula (1):

(1)

wherein the $R^5$ groups are derived from a dihydroxy compound that can be aliphatic, alicyclic, aromatic, or a combination of different types of groups.

In one embodiment, each $R^5$ group in formula (1) is a divalent aromatic group, for example derived from an aromatic dihydroxy compound of the formula (2):

$$HO-A^1-Y^1-A^2-OH \quad (2)$$

wherein each of $A^1$ and $A^2$ is independently a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (2) are bisphenol compounds of general formula (3):

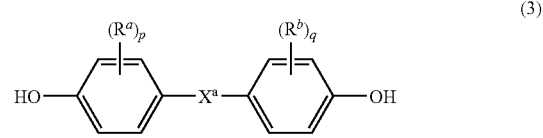
(3)

wherein $R^a$ and $R^b$ are each independently a halogen atom or a monovalent hydrocarbon group; p and q are each independently integers of 0 to 4; and $X^a$ represents a single bond or one of the groups of formulas (4) or (5):

(4)

(5)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

(6)

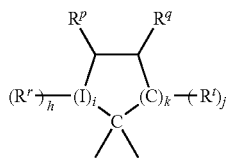

wherein $R^r$, $R^p$, $R^q$, and $R^t$ are each independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

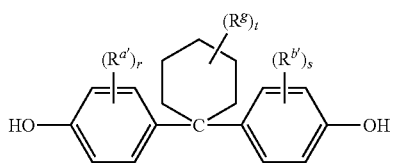

(7)

wherein substituents $R^{a\prime}$ and $R^{b\prime}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a\prime}$ and $R^{b\prime}$ is independently $C_{1-12}$ alkyl. In a specific embodiment, where r and/or s is 1 or greater, at least one of each of $R^{a\prime}$ and $R^{b\prime}$ are disposed meta to the cyclohexylidene bridging group. The substituents $R^{a\prime}$, $R^{b\prime}$, and $R^g$ may, when comprising an appropriate number of carbon atoms, be straight chain, cyclic, bicyclic, branched, saturated, or unsaturated. In a specific embodiment, $R^{a\prime}$, $R^{b\prime}$, and $R^g$ are each $C_{1-4}$ alkyl, specifically methyl. In still another embodiment, $R^{a\prime}$, $R^{b\prime}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the trade name APEC®.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (2) include 1,1-bis(4-hydroxyphenyl)methane, 1,1-bis(4-hydroxyphenyl)ethane, 2,2-bis(4-hydroxyphenyl)propane (hereinafter "Bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing bisphenol compounds can also be used.

The polycarbonates used herein can also be aliphatic diol-based polycarbonates in which $R^5$ of formula (1) is a $C_{1-60}$ aliphatic group. In one embodiment $R^5$ is a fused cyclic alkyloxy group, for example those based on fused furan ring structures found in aliphatic diols such as isosorbide. The isosorbide can be a mixture of isomers or from individual isomers of isosorbide. Isosorbide has the general formula (8):

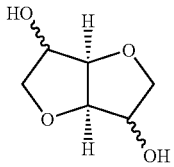

(8)

and can be a single diol isomer or mixture of diol isomers. These diols can be prepared by the dehydration of the corresponding hexitols. Hexitols are produced commercially from the corresponding sugars (aldohexose). Specific aliphatic diols of formula (8) include 1,4; 3,6-dianhydro-D glucitol, 1,4; 3,6-dianhydro-D mannitol, and 1,4; 3,6-dianhydro-L iditol. Isosorbides are available commercially from various chemical suppliers, including Cargill, Roquette, and Shanxi. Advantageously, isosorbides can be "biosourced," that is, derived from a biological feedstock.

In another embodiment $R^5$ is derived from a linear, branched, or cyclic $C_{14\text{-}44}$ aliphatic diol of formula (9):

$$HOCH_2\text{-}L\text{-}CH_2OH \quad (9)$$

wherein L is a linear, branched, or cyclic aliphatic $C_{14\text{-}44}$ group. More specifically, L is a branched $C_{12\text{-}42}$ alkylene or $C_{12\text{-}42}$ alkenylene group, or a monocyclic, polycyclic, or fused polycyclic $C_{3\text{-}12}$ cycloalkylene, $C_{5\text{-}12}$ cycloalkenylene, or $C_{3\text{-}12}$ cycloalkylidenyl, group. In a specific embodiment, L is a $C_{12\text{-}42}$ alkylene group comprising two alkyl branches, and diol (9) is a branched, dimeric $C_{36}$ or $C_{44}$ fatty acid diol. In another specific embodiment, the diol (9) is a branched or linear $C_{13\text{-}18}$ dimeric fatty acid diol. A specific diol of this type is the $C_{14\text{-}44}$ aliphatic diol of formula (10):

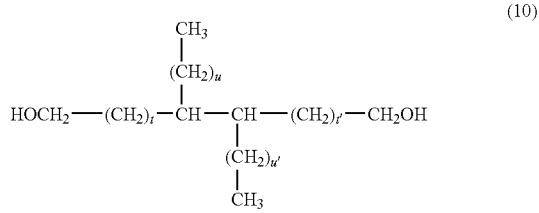

(10)

where t and t' are each independently 0 to 38, u and u' are each independently 0 to 38, and the sum of (t+t'+u+u') is an integer from 8 to 38. In specific embodiments, t and t' are each independently 0 to 30, u and u' are each independently 0 to 30, and the sum (t+t'+u+u') is 30; t and t' are each independently 5 to 10, u and u' are each independently 5 to 10, and the sum (t+t'+u+u') is 30; t and t' are each independently 7 or 8, u and u' are each independently 7 or 8, and the sum of (t+t'+u+u') is 30; where t and t' are each independently 0 to 30, u and u' are each independently 0 to 30, and the (sum t+t'+u+u') is 38; or t and t' are each independently 12 or 13, u and u' are each independently 6 or 7, and the sum of (t+t'+u+u') is 38.

$R^5$ can also be derived from a dihydroxy aromatic compound of formula (11):

(11)

wherein each $R^f$ is independently $C_{1\text{-}12}$ alkyl, or halogen, and u is 0 to 4. It will be understood that $R^f$ is hydrogen when u is 0. Typically, the halogen can be chlorine or bromine. In an embodiment, compounds of formula (11) in which the —OH groups are substituted meta to one another, and wherein $R^f$ and u are as described above, are also generally referred to herein as resorcinols. Examples include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Polysiloxane units can also be incorporated into the polycarbonate copolymers.

In one embodiment, the polycarbonate is a homopolycarbonate wherein $R^5$ is derived from one of bisphenol A, isosorbide, or an aliphatic diol of formula (9), specifically formula (10). In another embodiment, a copolycarbonate is used, wherein $R^5$ is derived from at least two of bisphenol A, isosorbide, and an aliphatic diol of formula (9), specifically formula (10). In another specific embodiment, a copolycarbonate is used, wherein $R^5$ is derived from one bisphenol A, isosorbide, or an aliphatic diol of formula (9), specifically formula (10), and another dihydroxy compound, for example resorcinol. In still another embodiment, $R^5$ is derived from at least two of bisphenol A, isosorbide, an aliphatic diol of formula (9), specifically formula (10), and another dihydroxy compound, for example resorcinol.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

"Polycarbonates" as used herein includes copolymers comprising carbonate units and other types of polymer units, including ester units. A specific type of polycarbonate copolymer is a polyester carbonate, also known as a polyester-polycarbonate. Such copolymers further contain, in addition to recurring carbonate chain units of the formula (1), carbonate units derived from oligomeric ester-containing dihydroxy compounds comprising repeating units of formula (12):

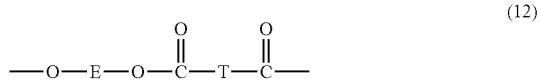

(12)

wherein E is a divalent group derived from a dihydroxy compound, and can be, for example, a $C_{2\text{-}120}$ alkylene group, a $C_{6\text{-}120}$ alicyclic group, a $C_{6\text{-}120}$ aromatic group, or a $C_{2\text{-}200}$ polyoxyalkylene group in which the alkylene groups contain 2 to 6 carbon atoms, specifically 2, 3, or 4 carbon atoms, or a combination of at least one of the foregoing groups; and T is a divalent group derived from a dicarboxylic acid, and can be, for example, a $C_{2\text{-}120}$ alkylene group, a $C_{6\text{-}120}$ alicyclic group, a $C_{6\text{-}120}$ alkyl aromatic group, or a $C_{6\text{-}120}$ aromatic group or a combination of at least one of the foregoing groups. More specifically, E can be a $C_{2\text{-}60}$ alkylene, a $C_{6\text{-}20}$ cycloalkylene, a $C_{6\text{-}20}$ arylene, or a $C_4$-$C_{30}$ polyoxyalkylene in which the alkylene groups contain 2 to 6 carbon atoms, or a combination comprising at least one of the foregoing groups, and T is a $C_{2\text{-}60}$ alkylene, a $C_{6\text{-}20}$ cycloalkylene, a $C_{6\text{-}20}$ alkylarylene, or a $C_{6\text{-}20}$ arylene group, and the like, or a combination comprising at least one of the foregoing groups.

Generally, polyester-polycarbonates comprise units of formula (12) where in some embodiments E is a $C_{2\text{-}120}$ alkylene group having a straight chain, branched chain, or cyclic (including polycyclic) structure. In other embodiments, E is derived from a dihydroxy aromatic compound of formula (2). In yet other embodiments, E is derived from a dihydroxy aromatic compound of formula (11). In a specific embodiment, (E) is a group derived from an aliphatic diol, specifically the diol of formulas (8), (9), or (10), still more specifically from isosorbide. Where the aliphatic chain is long, for example greater than 18 carbon atoms, it can be branched to prevent crystallization. Thus, in a specific embodiment, E is a $C_{14}$-$C_{120}$ alkylene group, specifically a $C_{14}$-$C_{44}$ alkylene group having a branched chain structure, such that the aliphatic alkylene chain does not crystallize in the polymer.

Examples of aromatic dicarboxylic acids that can be used to prepare the polyester units include isophthalic or terephthalic acid, 1,2-di (p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98.

Other exemplary aliphatic diacids include linear, branched or cyclic $C_{3\text{-}44}$ aliphatic diacids of the formula (13), $$HO_2C\text{-}M\text{-}CO_2H \quad (13)$$

wherein M is a linear, branched, or cyclic $C_{1\text{-}10}$ aliphatic group. The $C_{3\text{-}12}$ linear, branched, or cyclic aliphatic diacids include, for example alpha, omega diacids such as oxalic acid, 1,4-propanedioic acid, 1,4-butanedioc acid, 1,6-haxanedioci acid, 1,8-octanedioic acid, 1,10-decanedioic acid, and 1,12-dodecanedioic acid (DDDA).

In another embodiment, T is derived from an aliphatic diacid of formula (14)

$$HO_2C\text{-}L\text{-}CO_2H \quad (14)$$

wherein L is a linear, branched, or cyclic $C_{12\text{-}42}$ aliphatic group as described in formula (9). In a specific embodiment, the aliphatic diacid of formula (14) is a branched, dimeric $C_{36}$ or $C_{44}$ fatty acid, or a the $C_{36}$ or $C_{44}$ dimeric fatty acid is branched to prevent crystallization of the alkylene or alkenylene chain.

In a specific embodiment, the aliphatic diacid is a $C_{14\text{-}44}$ aliphatic diacid of formula (15):

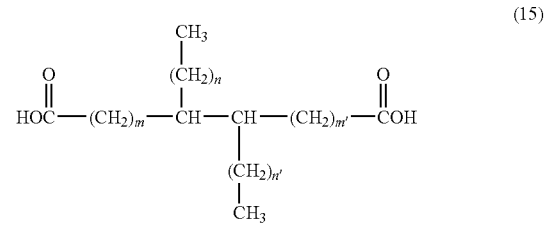

(15)

where m and m' are each independently 0 to 38, n and n' are each independently 0 to 38, and the sum of (m+m'+n+n') is an integer from 8 to 38. In a specific embodiment, m and m' are each independently 0 to 30, n and n' are each independently 0 to 30, and the sum of (sum m+m'+n+n') is 30; each m and m' are each independently 5 to 10, n and n' are each independently 5 to 10, and the sum of (m+m'+n+n') is 30; m and m' are each independently 7 or 8, n and n' are each independently 7 or 8, and the sum of (m+m'+n+n') is 30; m and m' are each independently 0 to 30, n and n' are each independently 0 to 30, and the sum of (m+m'+n+n') is 38; or m and m' are each independently 12 or 13, n and n' are each independently 6 or 7, and the sum of (m+m'+n+n') is 38. Such diacids are also referred to generally as dimeric fatty acids, and can be derived from the condensation of readily available biologically derived feedstocks, (such as vegetable oils). The diacids can also be prepared from other commercially available feedstocks such as petroleum derivatives, coal extracts, animal sources, other plant sources such as timber, and the like, and so should not be considered as limited to vegetable or crop sources. Dimer fatty acids derived from natural sources are available commercially from chemical suppliers including Uniqema, Cognis, and Oleon.

Specific types of ester units of formula (12) are derived from the reaction of a combination of isophthalic and terephthalic diacids (or derivatives thereof) with resorcinol, bisphenol A, or a combination thereof. In another specific embodiment, E is a $C_{2\text{-}6}$ alkylene group and T is p-phenylene, m-phenylene, naphthalene, a divalent cycloaliphatic group, or a combination thereof. This class of polyester includes the poly(alkylene terephthalates).

Still other specific ester units include units derived from the reaction of aliphatic diols of formula (8) and aliphatic diacids of formulas (13) or (14), specifically aliphatic diacids of formula (15). In one embodiment, the polyester units are derived from the reaction of isosorbide and aliphatic diacids of formula (15) wherein m and m' are each independently 7 or 8, n and n' are each independently 7 or 8, and the sum of (m+m'+n+n') is 30. Other specific polyester units are derived from the reaction of aliphatic diols of formula (9) with aliphatic diacids of formula (13) or (14), specifically aliphatic diols of formula (10) with aliphatic diols of formula (15). For example, a polyester unit can be derived from an aliphatic diol of formula (10) wherein m, m', t, and t' are each independently 7 or 8 and the sum of (m+m'+n+n') is 30, with an aliphatic diacid of formula (15) wherein n, n', u, and u' are each independently 7 or 8, and the sums of (t+t'+u+u') is 30. A combination of different types of polyester units can be present in the copolycarbonate-polyesters, for example a combination of ester units derived from isosorbide (8) and an aliphatic diacid (13) or (15) and ester units derived from an aliphatic diol (10) and an aliphatic diacid (13) or (15).

The foregoing specific types of ester units can be used in combination with a variety of polycarbonate units. However, in a specific embodiment, the foregoing specific types of ester units are used in combination with carbonate units wherein $R^5$ is derived from one of bisphenol A, isosorbide, or an aliphatic diol of formula (9), specifically formula (10). In specific embodiment, the foregoing specific types of ester units are used in combination with carbonate units wherein $R^5$ is derived from at least two of bisphenol A, isosorbide and an aliphatic diol of formula (9), specifically formula (10). In another specific embodiment, the foregoing specific types of ester units are used in combination with carbonate units wherein $R^5$ is derived from one of bisphenol A, isosorbide or an aliphatic diol of formula (9), specifically formula (10), and another dihydroxy compound, for example resorcinol. In still another embodiment, $R^5$ comprises two or more of bisphenol A, isosorbide, an aliphatic diol of formula (9), specifically formula (10), and another dihydroxy compound, specifically resorcinol. A specific polycarbonate-polyester comprises carbonate units derived from isosorbide, ester units derived from the reaction of isosorbide and an aliphatic diacid of formula (15), and ester units derived from an aliphatic diol of formula (10) and an aliphatic diacid of formula (15).

Where ester units are formed in the absence of other linking chemistry (e.g., carbonate precursors such as phosgene, or diaryl carbonates), the individual esters oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically 4 to 100, specifically 5 to 90, more specifically greater 8 to 70. In a specific embodiment, the number of ester units of formula (10) in a polyester block can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers can vary broadly, for example 1:99 to 99:1, specifically 10:90 to 90:10, more specifically 25:75 to 75:25, depending on the desired properties of the final composition.

The relative amount of each type of carbonate and/or ester unit present in a polycarbonate comprising isosorbide will depend on the desired properties of the polycarbonate. In an embodiment, the olefin group terminated polycarbonate comprises 65 to 95 wt % units derived from isosorbide, specifically 70 to 90 wt %, more specifically 75 to 85 wt %. Alternatively, an isosorbide-based polycarbonate or polyester-polycarbonate can comprise 55 to 97.5 mol %, specifically 60 to 95 mol %, even more specifically 65 to 90 mol % of isosorbide units, wherein the isosorbide units can be present in the carbonate units, the ester units, or both. Alternatively, or in addition, an isosorbide-based polycarbonate or polyester-polycarbonate can comprise 2.5 to 15 mol %, specifically 3 to 13 mol %, even more specifically 5 to 10 mol % of aliphatic units derived from aliphatic diols of formula (9), specifically formula (10) and/or aliphatic diacids of formula (13), specifically formula (14). Isosorbide-based polycarbonates can further comprise 0 to 42.5 mol %, specifically 2 to 40 mol %, even more specifically 5 to 30 mol % of additional units that can be carbonate and/or ester units and that are not the same as the isosorbide or aliphatic units of formulas (9), (10), (13), and (14). In an embodiment, each of the additional carbonate units is derived from the dihydroxy aromatic compound of formula (2), in particular bisphenol A.

As stated above, it has unexpectedly been found that it is possible to incorporate a terminal group containing an olefin (referred to herein as a "terminal olefin group") into a polycarbonate in the melt without the need for special endcapping agents, solution phase reactions, or interfacial processes. The terminal olefin groups are obtained by reaction of a polycarbonate with a compound comprising a primary, secondary or tertiary alcohol and having a beta-hydrogen, that is, a hydrogen on a carbon atom beta to the carbon atom bearing the primary, secondary or tertiary alcohol. As is understood in the art, a primary alcohol is a compound containing at least one alcohol moiety of the general formula $RCH_2OH$; a secondary alcohol it a compound containing at least one alcohol moiety of the general formula $R_2CHOH$; and a tertiary alcohol is a compound containing at least one alcohol moiety of the general formula $R_3COH$. At least on additional functional group reactive with the polycarbonate is also present in the compound, for example an alcohol, carboxylic acid, carboxylic ester, carbonyl halide, or the like. Exemplary polycarbonate reactive compounds comprising a primary, secondary or tertiary alcohol and having a beta-hydrogen include compounds of the formulas (16), (17), and (18):

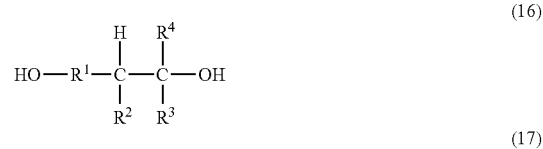

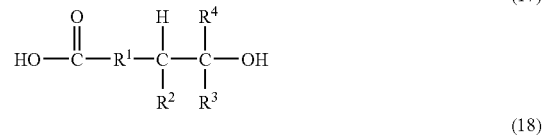

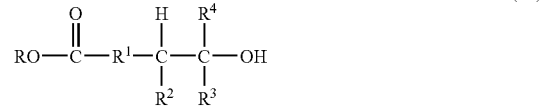

or a combination comprising at least one of the foregoing compounds. In a specific embodiment, compounds having a secondary or tertiary alcohol on a carbon beta to carbon containing a hydrogen atom are used.

In formulas (16), (17), and (18), $R^1$ is a $C_1$-$C_{40}$ hydrocarbon that can be unsubstituted or substituted with a halogen, olefin, ether, ketone, or $C_4$-$C_{30}$ polyoxyalkylene functionality in which the alkylene groups contain 2 to 6 carbon atoms. $R^1$ can be linear, branched, or cyclic, including polycyclic. In a specific embodiment, $R^1$ is unsubstituted or substituted with an olefin, ether, or $C_4$-$C_{30}$ polyoxyalkylene functionality.

Further in formulas (16), (17), and (18), $R^2$ to $R^4$ are each independently a hydrogen or a $C_1$-$C_{40}$ hydrocarbon that can be unsubstituted or substituted with a halogen, olefin, ether, ketone, or a $C_4$-$C_{30}$ polyoxyalkylene functionality in which the alkylene groups contain 2 to 6 carbon atoms. $R^2$ to $R^4$ can be linear, branched, or cyclic. In a specific embodiment, each $R^2$ to $R^4$ is unsubstituted or substituted with an olefin, ether, or $C_4$-$C_{30}$ polyoxyalkylene functionality in which the alkylene groups contain 2 to 6 carbon atoms. In one embodiment, $R^2$ and $R^3$ are each a hydrogen atom, and in another embodiment, $R^3$ and $R^4$ are each a hydrogen atom.

Optionally, any two of $R^1$, $R^2$, $R^3$, and $R^4$ together form a monocyclic, bicyclic, or tricyclic ring system optionally substituted with a heteroatom in one or more of the rings, more specifically with a sulfur, nitrogen, oxygen, or a combination comprising at least one of the foregoing atoms, most specifically an oxygen atom. In a specific embodiment, $R^1$ and $R^4$ together form a bicyclic ring system wherein each ring contains an ether oxygen atom. In this embodiment, and $R^2$ and $R^3$ are each a hydrogen atom.

R in formula (18) is a $C_{1-22}$ hydrocarbon, specifically a $C_{1-6}$ alkyl group, more specifically methyl.

Specifically, $R^1$ is an unsubstituted or substituted $C_1$-$C_{44}$ alkyl, $C_1$-$C_{40}$ alkylene, $C_3$-$C_{30}$ cycloalkylene, $C_6$-$C_{30}$ arylene, $C_2$-$C_{30}$ alkenylene, $C_7$-$C_{30}$ arylalkylene, $C_7$-$C_{30}$ alkylarylene, $C_8$-$C_{30}$ arylalkenylene, $C_1$-$C_{13}$ alkyleneoxy, $C_6$-$C_{30}$ aryleneoxy, $C_2$-$C_{30}$ alkenyleneoxy, $C_3$-$C_{30}$ cycloalkyleneoxy, $C_7$-$C_{30}$ alkylenearyloxy, $C_7$-$C_{30}$ arylenealkyloxy, or a $C_4$-$C_{30}$ polyoxyalkylene in which the alkylene groups contain 2 to 6 carbon atoms, or a combination comprising at least one of the foregoing groups, and $R^2$ to $R^4$ are each independently a hydrogen or unsubstituted or substituted $C_1$-$C_{30}$ alkyl, $C_3$-$C_{30}$ cycloalkyl, $C_6$-$C_{30}$ aryl, $C_2$-$C_{30}$ alkenyl, $C_7$-$C_{30}$ arylalkyl, $C_7$-$C_{30}$ alkylaryl, $C_8$-$C_{30}$ arylalkenyl, $C_1$-$C_{13}$ alkoxy, $C_6$-$C_{30}$ aryloxy, $C_2$-$C_{30}$ alkenyloxy, $C_3$-$C_{30}$ cycloalkoxy, $C_7$-$C_{30}$ alkylaryloxy, or a $C_4$-$C_{30}$ polyoxyalkylene in which the alkylene groups contain 2 to 6 carbon atoms, or a combination comprising at least one of the foregoing groups. When present, the substituents on $R^1$ to $R^4$ are a halogen, olefin, ether, or $C_4$-$C_{30}$ polyoxyalkylene functionality. One or more substituents can be present on each group, provided that the available valences are not exceeded.

Within the scope of this embodiment, $R^1$ is a $C_1$-$C_{40}$ alkylene, $C_3$-$C_{30}$ cycloalkylene, $C_6$-$C_{30}$ arylene, $C_2$-$C_{30}$ alkenylene, $C_7$-$C_{30}$ arylalkylene, $C_7$-$C_{30}$ alkylarylene, or $C_8$-$C_{30}$ arylalkenylene, and $R^2$ to $R^4$ are each independently a hydrogen, $C_1$-$C_{20}$ alkyl, $C_3$-$C_8$ cycloalkyl, $C_6$-$C_{12}$ aryl, $C_2$-$C_{12}$ alkenyl, $C_7$-$C_{13}$ arylalkyl, $C_7$-$C_{13}$ alkylaryl, or $C_8$-$C_{12}$ arylalkenyl. Even more specifically, $R^1$ is a $C_1$-$C_{40}$ alkylene, and $R^2$ to $R^4$ are each independently a hydrogen, $C_1$-C alkyl, or $C_2$-$C_{12}$ alkenyl.

In a specific embodiment, the diol of formula (16) is an aliphatic diol that contains a fused cyclic alkyloxy group, for example a fused furan ring structure such as isosorbide. The isosorbide of formula (8) can be specifically mentioned. A single isomer or mixture of isosorbide isomers can be used.

In another embodiment the diol of formula (16) is a linear, branched, or cyclic $C_{14-44}$ aliphatic diol of formula (9). In a specific embodiment, L is a $C_{12-42}$ alkylene group comprising two alkyl branches, and diol (16) is a $C_{36}$ or $C_{44}$ fatty acid diol. In another specific embodiment, the diol (16) is a branched or linear $C_{13-18}$ dimeric fatty acid diol. A specific diol of this type is the $C_{14-44}$ aliphatic diol of formula (10) wherein t, t', u, and u' are as defined in formula (10).

Specific exemplary primary, secondary, and tertiary alcohols having a beta-hydrogen that can be used for the formation of the olefin terminal groups include isosorbide, hexylene glycol, octylene glycol, decylene diol, dodecylene diol, tricyclodecanedimethanol and a $C_{36}$ branched fatty diol. A combination of different diols can be used.

In an advantageous feature, the polycarbonate is reacted with the primary, secondary or tertiary alcohol having a beta-hydrogen at high temperature in the melt. The reaction can occur during the manufacture of the polycarbonate, or after manufacture and isolation. When reaction is during manufacture of the polycarbonate, melt processes as described above are used. In an exemplary melt process, the polycarbonate is manufactured using bis(methylsalicyl)carbonate (CAS Registry No. 82091-12-1) (also known as BMSC).

Conditions effective to achieve reaction include melt mixing at an effective temperature and for an effective time. A variety of processes can be used to achieve the requisite conditions, for example injection molding, compression molding, or a reactive extrusion process. Effective temperatures in a reactive extrusion process are barrel set temperatures from 225 to 350° C., specifically from 250 to 325° C., more specifically from 270 to 320° C. Without being bound by theory, it is to be understood that the barrel set-point temperature in a reactive extrusion process can differ from the actual temperature of the melt because the temperature of the polymer resin can increase as a result of the extrusion process. The increase in temperature can result from the high viscosity of polymer resins subjected to mixing or stirring in the process of extrusion and subsequent energy dissipation. Effective times will vary, depending on the temperature, in that lower temperatures may require longer times. The longer residence times provided by molding, for example, can provide product at temperatures from 210 to 325° C., specifically from 220 to 275° C., more specifically from 230 to 270° C.

The degree of olefin formation can be controlled by manipulation of parameters such as the temperature of the melt polymerization and the residence time of the polycarbonate in the reactor. Where a screw type extruder is used as the reactor, the residence time can be controlled by selection of the screw speed of the extruder and/or by selection of the number of kneading elements in the extruder. In addition, formation of terminal olefin groups can be further controlled by effectively extending the residence time through the use of a melt filtration system, or substantially similar process. In general, in an extruder, the reaction proceeds for 0.1 to 5 minutes, specifically 0.25 to 4 minutes, more specifically 0.5 to 3 minutes. Longer times are suitable for other processes, where the residence time of the can be 0.1 to 15 minutes, specifically 0.5 to 10 minutes, more specifically 1 to 5 minutes.

Without being bound by theory, it is believed that terminal olefin group formation occurs by a beta elimination reaction, illustrated by the following reaction scheme:

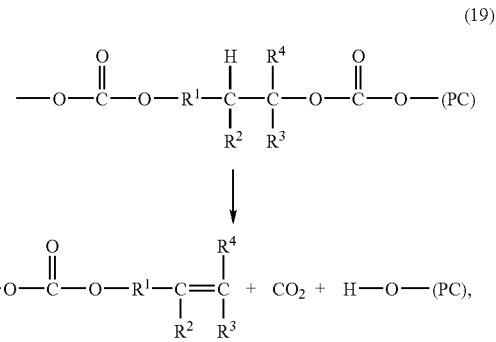

(19)

wherein R¹ to R⁴ are as described above and PC represents the balance of the polycarbonate polymer backbone.

Thus, the disclosed process provides a polycarbonate with a terminal olefin group of formula (20):

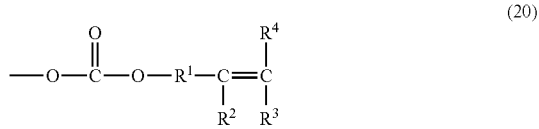

wherein R¹ to R⁴ are as described above. In a specific embodiment, the disclosed process provides a polycarbonate with a terminal olefin group of formula (21A) and/or (21B):

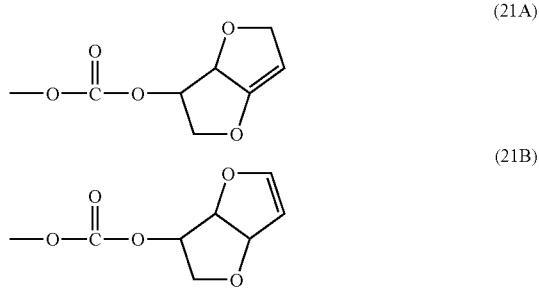

The olefin groups are formed selectively at chain ends of the polycarbonate. In an unexpected and advantageous feature, formation of the terminal olefin groups does not cause significant changes in the polydispersity of the polycarbonate.

The olefin group terminated polycarbonate can comprise 0.01 mole % olefin to 5 mol % olefin, specifically 0.05 mol % olefin to 2.5 mol % olefin, more specifically 0.05 mol % olefin to 0.5 mol % olefin, most specifically 0.05 to 0.3 mol % olefin.

The olefin group terminated polycarbonates can have an intrinsic viscosity, as determined in chloroform at 25° C., of 0.3 to 1.5 deciliters per gram (dl/gm), specifically 0.45 to 1.0 dl/gm.

The olefin group terminated polycarbonates can have a weight average molecular weight of 10,000 to 200,000 daltons, specifically 20,000 to 100,000 daltons as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5.

The olefin group terminated polycarbonates can have a melt volume ratio (MVR) of 0.5 to 80 cm³/10 minutes, more specifically 2 to 40 cm³/10 minutes, when measured at 250° C. under a load of 5 kg according to ASTM D1238-04.

The olefin group terminated polycarbonates can further be manufactured to be substantially transparent. In some embodiments, the polycarbonate can have a transparency of greater than or equal to 55%, specifically greater than or equal to 60%, more specifically greater than or equal to 70%, still more specifically greater than or equal to 80%, and still more specifically greater than or equal to 90%, measured using 3.2 mm plaques according to ASTM D1003-00. Alternatively, or in addition, the polycarbonates can have a haze of less than or equal to 15%, specifically less than or equal to 10%, and still more specifically less than or equal to 5%, measured using 3.2 mm thick plaques according to ASTM-D1003-00.

In one embodiment, the olefin group terminated, isosorbide-based polycarbonates can have a glass transition temperature (Tg) of less than or equal to 170° C., specifically 85 to 160° C., specifically 90 to 155° C., more specifically 90 to 145° C., and still more specifically 90 to 120° C. In another embodiment, the olefin group terminated, isosorbide-based polycarbonates can have a glass transition temperature (Tg) of less than or equal to 135° C., specifically 85 to 130° C., specifically 90 to 130° C., more specifically 90 to 125° C., and still more specifically 90 to 120° C. Glass transition temperature can be determined by differential scanning calorimetry (DSC) at a scan rate of 10° C./min.

The terminal olefin groups introduced into polycarbonate by the disclosed processes can be used as sites for further modification of the polycarbonate. For example, linear block copolymers can be made by grafting blocks of another polymer type on to the polycarbonate at the terminal olefin groups, thereby accomplishing chain extension. Low molecular weight blocks of polycarbonate comprising terminal olefin groups can used as building blocks in further radical polymerization reactions.

Alternatively, the terminal olefin groups can be used to crosslink the polycarbonates. For example, the olefins can be reacted with compounds comprising an unsaturated moiety, preferably a vinyl (—CH═CH₂) moiety, specifically divinyl benzene, in order to crosslink the polycarbonate chains. Crosslinking can be used to modify or enhance the properties of the polycarbonates, for example ductility and impact properties.

Functional groups can be introduced to the polycarbonates by radical graft polymerization at the terminal olefin group. Useful functional groups include alcohols, carboxylic acids, carboxylic esters, aliphatic chains and ionomeric units, and the like.

In addition, the terminal olefin groups can be used as points of attachment to the polymer chain for polymer additives such as anti-static additives, anti-oxidant additives, thermal stabilizers, and colorants. It is anticipated that bonding an additive to the terminal olefin group will mitigate issues in polymer processing including plate-out, phase separation and loss of the additive from the bulk of the resin due to processes such as surface migration, devolatization, and the like during thermal processing or use of the polycarbonate.

The disclosed polycarbonates comprising a terminal olefin group can also be used as a compatibilizer to improve the properties of polymer blends, that is compositions comprising two or more different types of polymers. In an embodiment, the polycarbonate (in particular an isosorbide based polycarbonate) comprising a terminal olefin group is itself used as a compatibilizer for two or more polymers. The particular units used to form the polycarbonate are selected so as to provide the desired compatibilization properties to the blend. The terminal olefin group-containing polycarbonate can be added to the blend at any point during the manufacture thereof, and in one embodiment is added under conditions effective to provide reaction between the terminal olefin groups and a component of the blend. In an alternative embodiment, the terminal olefin groups are reacted with a compound or oligomer that renders the derivatized polycarbonate suitable for use as a compatibilizer. For example, the disclosed embodiments are expected to provide materials useful as compatibilizers in polymer blends that include polystyrene, poly(methyl methacrylate), and others.

Thus, in one embodiment, a polycarbonate of formula (22) is provided:

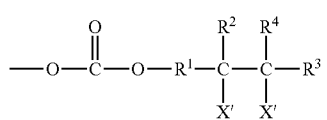

(22)

where $R^2$ to $R^4$ are as described above, and each $X'$ is independently a hydrogen, a polymer, an oligomer, a compatibilizer, a crosslinker, an ultraviolet light stabilizer, a thermal stabilizer, a mold release agent, a gamma-stabilizer, a flame retardant, or an antioxidant.

Thermoplastic compositions comprising the above-described olefin-group terminated polycarbonates and reactive products thereof are also described. Such compositions can comprise other thermoplastic polymers, for example, other polycarbonates (including homopolycarbonates, copolycarbonates, polysiloxane-polycarbonates, and polyester-polycarbonates), polyesters, polyamides, polyimides, poly(arylene ethers), and the like, and impact modifiers, or a combination comprising at least one of the foregoing additional polymers. These combinations can comprise 1 to 99 weight percent (wt %), specifically 10 to 90 wt %, more specifically 20 to 80 wt % of the disclosed polycarbonates, with the remainder of the compositions being the other polymers and/or additives as described below.

Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Impact modifiers, where used, are generally present in amounts of 1 to 30 wt %, based on the total weight of the isosorbide-based polycarbonate, and any additional polymer including impact modifier, in the composition. In an embodiment, a thermoplastic composition comprises the isosorbide-based polycarbonate and an impact modifier. In a specific embodiment, the impact modifier is MBS.

The thermoplastic compositions can also include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers, where included, are generally used in amounts of 1 to 20 parts by weight, based on 100 parts by weight of polycarbonate and any additional polymer.

Exemplary antioxidant additives include, for example, organophosphites such as tris(nonyl phenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3 -methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.01 to 0.1 parts by weight, based on 100 parts by weight of polycarbonate, and any additional polymer.

Exemplary heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.01 to 0.1 parts by weight, based on 100 parts by weight of polycarbonate and any additional polymer.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.01 to 5 parts by weight, based on 100 parts by weight of polycarbonate and any additional polymer.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis [[(2-cyano-3,3-diphenylacryloyl)oxy]methyl] propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.01 to 5 parts by weight, based on 100 parts by weight of polycarbonate and any additional polymer.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol)copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.1 to 1 parts by weight, based on 100 parts by weight of polycarbonate and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and IRGASTAT® P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.05 to 0.5 parts by weight, based on 100 parts by weight of polycarbonate and any additional polymer.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.001 to 3 parts by weight, based on 100 parts by weight of polycarbonate and any additional polymer.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.0001 to 5 parts by weight, based on 100 parts by weight of polycarbonate and any additional polymer.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of 1 to 20 parts by weight, based on 100 parts by weight of polycarbonate and any additional polymer.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each is independently an alkyl, cycloalkyl, aryl, alkylaryl, or aralkyl group, provided that at least one is an aromatic group. Two of the groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

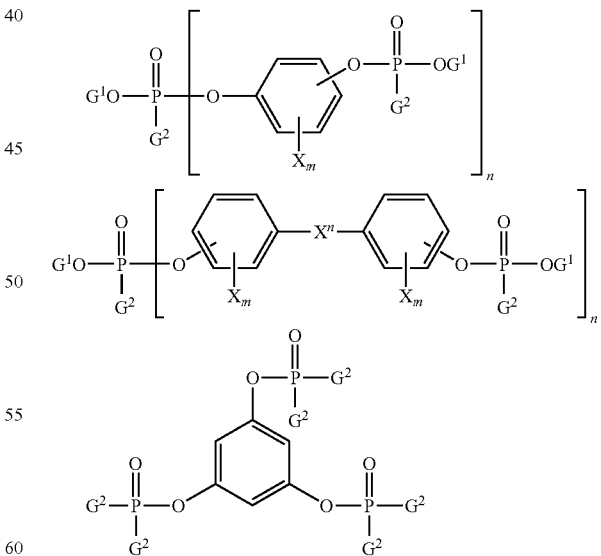

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of 0.1 to 30 parts by weight, more specifically 1 to 20 parts by weight, based on 100 parts by weight of polycarbonate and any additional polymer.

Halogenated materials can also be used as flame retardants, for example halogenated compounds and resins of formula (23):

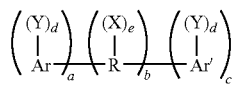

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (23) are each independently mono- or polycarbocyclic aromatic groups such as phenylene, biphenylene, terphenylene, naphthylene, or the like.

Y is an organic, inorganic, or organometallic radical, for example (a) halogen, e.g., chlorine, bromine, iodine, fluorine or (b) ether groups of the general formula OB, wherein B is a monovalent hydrocarbon group similar to X or (c) monovalent hydrocarbon groups of the type represented by R or (d) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an allyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, a direct carbon-carbon bond joins the aromatic groups.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 1 to 25 parts by weight, more specifically 2 to 20 parts by weight, based on 100 parts by weight of polycarbonate and any additional polymer.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of 0.01 to 10 parts by weight, more specifically 0.02 to 1 parts by weight, based on 100 parts by weight of polycarbonate and any additional polymer.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example in an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of polycarbonate and any additional polymer.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol(pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol(hexylene glycol), 2-phenyl-2-butanol, 3-hydroxy-3-methyl-2-butanone, 2-phenyl-2-butanol, and the like, and cyclic tertiary alcohols such as l-hydroxy-l-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight based on 100 parts by weight of polycarbonate and any additional polymer.

Thermoplastic compositions comprising the isosorbide-based polycarbonate can be manufactured by various methods. For example, powdered isosorbide-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The thermoplastic compositions described herein can be shaped, formed, or molded into a variety of articles. The thermoplastic compositions can be molded into useful shaped articles by a variety of means such as injection molding, extrusion, rotational molding, blow molding and thermoforming to form articles.

Shaped, formed, or molded articles comprising the polycarbonate compositions are also provided. The polycarbonate compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The thermoplastic composition can be used in automotive applications, for example as instrument panels, overhead consoles, interior trim, center consoles, and the like. Compositions as described herein have advantageous physical properties such as good impact resistance, low coefficient of thermal expansion, and low temperature ductility.

EXAMPLES

Gel Permeation Chromatography (GPC) was used to determine the molecular weights (Mw and Mn, and polydispersity) of the isosorbide-based (isosorbide) polycarbonates. The conditions used were as follows. A crosslinked styrene-divinylbenzene mixed-bed column (Polymer Laboratories PLGel 5 micrometer Mixed-C 300 mm×7.5 mm column) was used for the analysis. The column temperature was maintained at 30° C. The column was eluted with methylene chloride as eluent, at a flow rate of 0.3 ml per minute. The sample solution was prepared by dissolving 10 milligram (mg) of the isosorbide polycarbonate in 10 ml of chloroform for a sample concentration of 1.0 mg/ml. 10 microliters of the sample solution was injected in the column and the sample was eluted over a total run time of 17.5 minutes. A combination of a refractive index (RI) detector a UV detector operating at a detection wavelength of 254 nm, was used. A broad standard calibration curve (i.e., a universal calibration curve) was constructed, using polystyrene standards with narrow polydispersity, against which polymer molecular weights were determined. Molecular weights are expressed as molecular weights against polystyrene. A refractive index detector was used.

All NMR spectra were obtained on a Bruker Avance 400 MHz Spectrometer at a temperature of 44° C. For an analysis, a solution of 5% wt/v in $CDCl_3$ 99.8% D with 0.03 wt % TMS was prepared. All spectra were obtained with a spin-rate of 20 Hz. The $^1H$ NMR measurements were done at 400 MHz with a 5 mm diameter QNP probe, using a sweep width of 6410 Hz (13 to −3 ppm chemical shift range) with a 30° flip angle, 10 sec relaxation time, 32 k data points and 256 scans. Processing included apodization with 0.3 Hz for $^1H$ NMR.

Preparation of Polycarbonates—General Procedure

In the following examples, various homopolycarbonates, copolycarbonates, and polycarbonate-polyesters were prepared and then reacted in a batch process to provide a terminal olefin group, with intermediate isolation of the polymer in Examples 1 and 4 and without intermediate isolation of the polymer in Examples 2 and 3. A general procedure for preparation of the polymer is as follow. A 200-liter stainless steel stirred tank reactor was charged with BMSC and the appropriate monomers (isosorbide, and where used, BPA, C36 diacid, and/or resorcinol). An aqueous catalyst solution of sodium hydroxide (NaOH) was added to the reactor. The reactor was then evacuated and purged with nitrogen three times to remove residual oxygen and then put to a constant pressure of 80 kPa. The reactor was heated to the starting temperature (e.g., 160 to 180° C.) using a oil heater in order to melt the monomers and to start the oligomerization reaction. The subsequent exothermic reaction caused the temperature of the oligomer to increase above the set point of the oil temperature. When the exotherm peak started, the oil-temperature was reduced, i.e., to 150° C. After the exotherm peak, the molten reaction mixture was fed through a feed-line heated to 170° C. into an extruder at a rate approximately 11.5 kg/h. The extruder used was a Werner & Pfleiderer ZSK25WLE 25 mm 13-barrel twin-screw extruder with a length to diameter (L/D) ratio of 59. The feed into the extruder included a flash-valve to prevent boiling of the molten mixture. The reaction mixture was reactively extruded at a screw speed of 300 rpm. The extruder barrels were set to 260° C. and the die was set to 270° C. The extruder was equipped with five forward vacuum vents and one back-vent. The extruder had two vacuum systems, the low-vacuum, and high-vacuum. The backvent and the first forward vent were connected to the low-vacuum system, the other forward vent was connected to the high-vacuum system. The vacuum pressure at the back-vent was approximately 1.5 kPa, and the vacuum pressure of the first forward vent was approximately 1.0 kPa. The vacuum pressure of the final four vents was approximately 0.1 kPa. The methyl salicylate byproduct is removed via devolatilization through these vents. Collected at the end of the extruder through the die were molten strands of polymer that were solidified through a water bath and pelletized. Polymer thus extruded was used as the starting material for reaction to generate terminal olefin groups in an off-line melt mixing step as described in Example 1.

Example 1

Controlled Terminal Olefin Group Formation in an Off-Line Melt Mixing Step

To study the effect of high temperature on an isosorbide homopolycarbonate, a sample of the homopolycarbonate polymer prepared according the procedure described above, having a Mw of greater than 40000 g/mol polycarbonate was melt mixed under inert atmosphere in a glass 25 gram-scale-reactor. Prior to use, to remove any sodium from the glass of the reactor, the reactor was soaked first in 1M HCl for at least 24 hours followed by rinsing at least 5 times with 18.2 milli-ohm distilled water. After rinsing, the reactor was charged with 20 g of isosorbide homopolycarbonate, assembled, sealed, and the atmosphere was exchanged with nitrogen three times. The reactor was brought to near atmospheric pressure. The reaction time was started at the same moment as when the heaters were set to their first set point. The temperature of the reactor was maintained using a heating mantle with a PID controller. The pressure over the reactor was controlled by a nitrogen bleed into a vacuum pump downstream of the distillate collection flasks and measured with a pressure gauge.

To generate olefin terminal groups, the reactor, charged with the 20 g of isosorbide homopolycarbonate as prepared above, was set to 300° C., 80 kPa, and the overhead heated to 100° C. After 12 minutes, the stirrers were switched on and set to 40 rpm. When 30 minutes of melting time was reached, the reactor was then brought back to atmospheric pressure with nitrogen. When atmospheric pressure was reached, the stirrers were stopped and the produced material was drained from the reactor tubes by opening the reactors at the bottom and pushing out the material with a nitrogen over-pressure. The harvested material was then analyzed by $^1$H NMR spectroscopy in order to confirm that olefin end groups were formed in the melt mixing process.

The results of $^1$H NMR spectroscopic analysis of the product of Example 1 are shown in FIG. 1, which shows both 1H-NMR and 2D-COSY results. The spectrum in FIG. 1 includes a specific fairly narrow peak (about 0.02 ppm in width) centered at a chemical shift of between 6.6 ppm and 6.4 ppm, confirming the presence of carbon-carbon double bonds. This NMR spectral feature is absent in the proton NMR spectra of isosorbide polycarbonate homopolymers not treated by melt mixing. Correlation of cross-peaks with the NMR signals for isosorbide confirmed the proposed structure of the terminal olefin group. In addition, the J-coupling is 3 Hz, which is typical for double bonds. Also, the COSY shows connectivity of the double bond signal with isosorbide signals, thus the peak cannot result from an aromatic ring system. It is estimated that this method has a detection limit for these double bonds of approximately 0.05 mole % relative to the carbonate content of the polycarbonate polymer.

In contrast, analysis of isosorbide homopolycarbonates used as starting material for Example 1 and isosorbide copolymers also produced under similar conditions on the same Werner & Pfleiderer ZSK25WLE 25 mm 13-barrel twin-screw extruder with a length to diameter (L/D) ratio of 59 have not shown the presence of double bonds. The only exception is when extremely harsh extruder conditions are used (e.g. adiabatic runs), as described in Example 2.

Example 2

Vinyl Group Formation by High-Temperature (Adiabatic) Extrusion (On-Line Melt Mixing Step)

Two isosorbide-based terpolymer compositions, isosorbide/BPA/resorcinol (50/25/25) and isosorbide/BPA/C36 diacid (75/16/9), were prepared on an extruder line by the standard polymerization procedure as described above. After start-up of both extrusion runs, the heating/cooling of barrels 6-13 of a ZSK-25 extruder was turned off, and the run was allowed to proceed adiabatically. Fourteen samples were taken within each run. The molecular weight of each sample was determined as described above.

Figure 2:
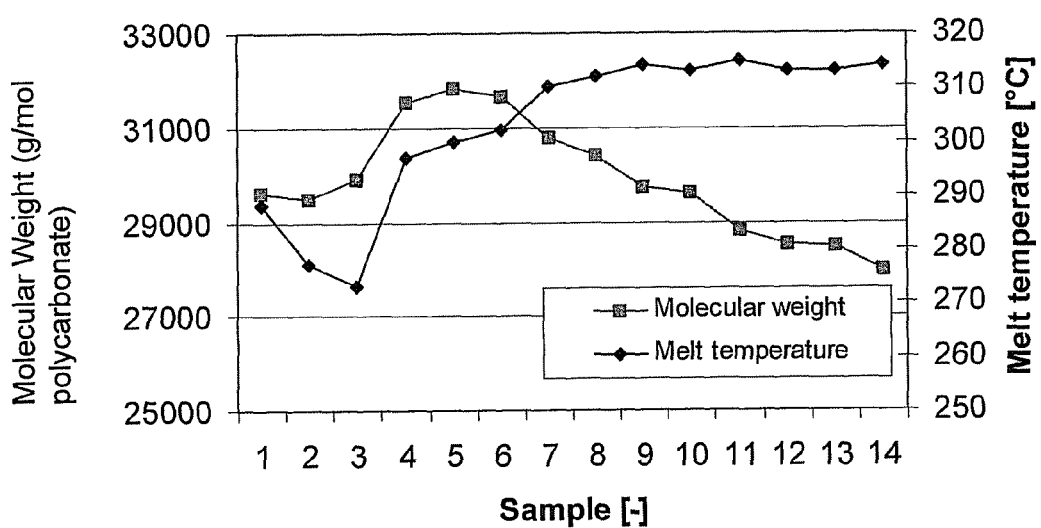
FIG. 2 is a plot of molecular weight and melt temperature for 14 samples isolated according to Example 2.
Figure 3:
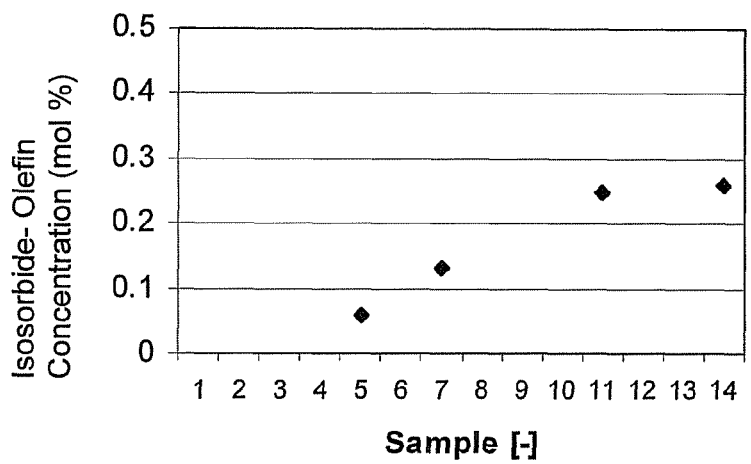
FIG. 3 is a plot of isosorbide-derived olefin concentration for four of the samples isolated according to Example 2.

A plot of the molecular weight and melt temperature for each isosorbide/BPA/C36 diacid sample is shown in FIG. 2. The concentration of olefin terminations as measured by the concentration of unsaturated isosorbide for each isosorbide/BPA/C36 diacid sample is shown in FIG. 3. FIGS. 2 and 3 show that the molecular weight of the isosorbide/BPA/C36 diacid terpolymer decreased and the concentration of isosorbide-derived olefin groups increased as the melt temperature of the polymer was increased.

Figure 4:
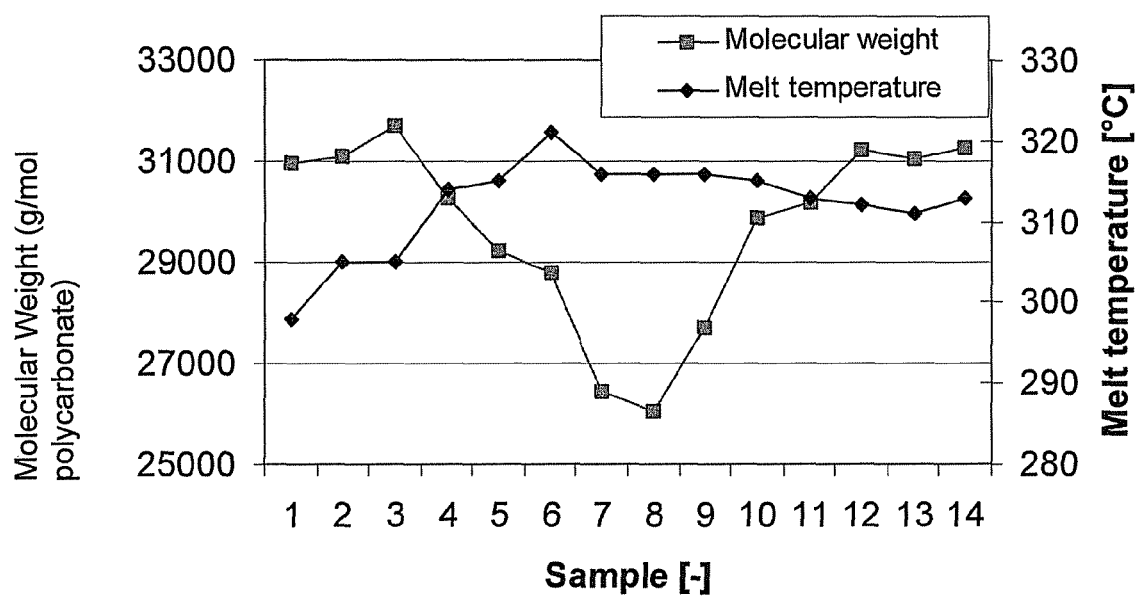
FIG. 4 is a plot of molecular weight and melt temperature for 14 samples isolated according to Example 3.
Figure 5:
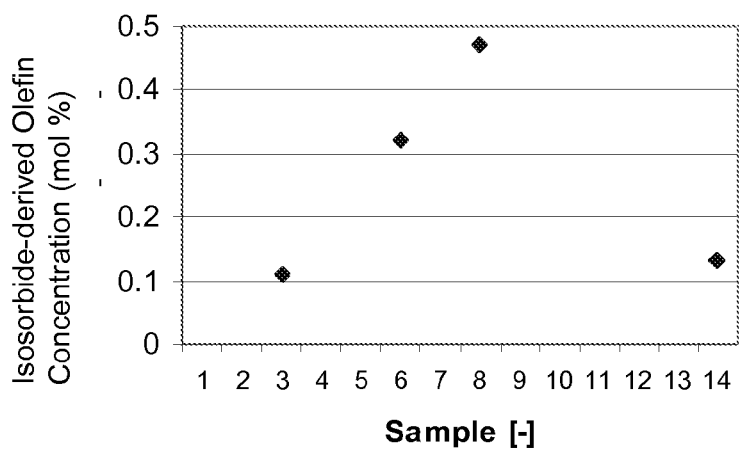
FIG. 5 is a plot of isosorbide-derived olefin concentration for four samples isolated according to Example 3.

The molecular weight and melt temperature for each isosorbide/BPA/resorcinol sample is shown in FIG. 4. The concentration of isosorbide-derived olefin terminations in each isosorbide/BPA/resorcinol terpolymer sample is plotted in FIG. 5. FIGS. 4 and 5 show that for samples 3 to 8, the molecular weight of the isosorbide/BPA/resorcinol terpolymer decreased and the concentration of olefin groups increased as the melt temperature of the polymer was increased. Sample 14 shows that when the melt temperature was decreased towards the starting conditions, the concentration of terminal olefin groups decreased.

Example 3

Commercial Scale Formation of Olefin Terminal Groups

Pilot plant production of an isosorbide/BPA/C36 diacid (80/13/7) terpolymer containing isosorbide terminal groups was performed as described above using instead a continuous polymerization process in a reactor train comprising two continuous stir tank reactors and a ZSK-58 reactive extruder, as shown in FIG. 9.

Figure 6:
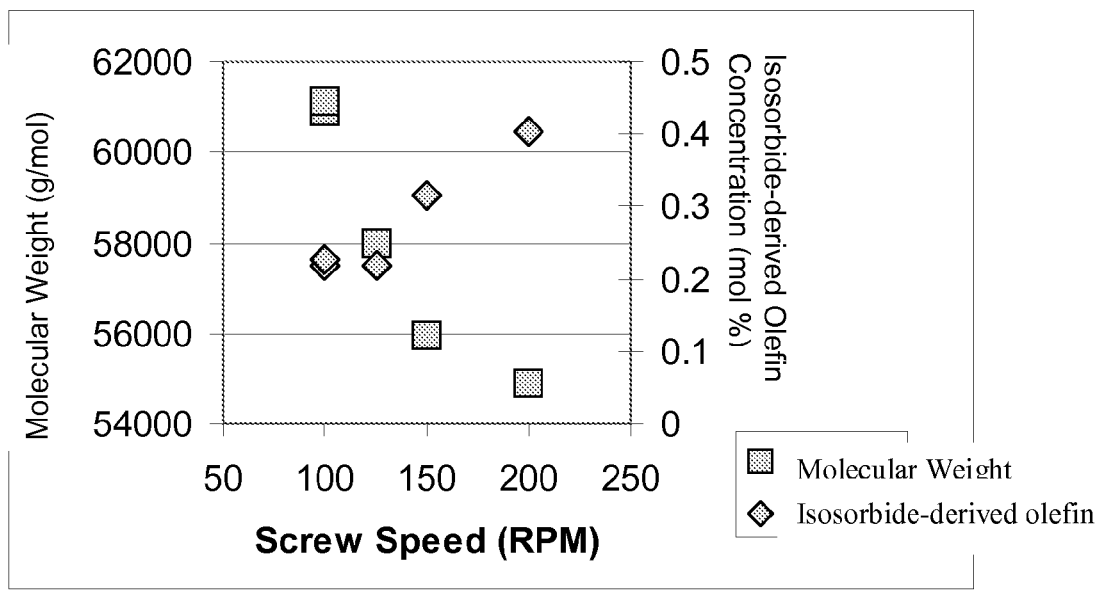
FIG. 6 is a plot of molecular weight and isosorbide-derived olefin concentration as described in Example 4.

FIG. 6 shows a plot of molecular weight and olefin termination as a function of screw speed, an demonstrates that increasing the screw speed in the reactive extruder during the melt polymerization process to prepare the isosorbide/BPA/C36 diacid (80/13/7) terpolymer results in greater formation of terminal olefin groups. At higher screw speeds, molecular weight decreased and terminal olefin concentration increased.

The data in Table 1 demonstrates that various factors can be used to increase or decrease the content of terminal olefin groups, including reactor temperature (R1), barrel temperature (Barrel T), and screw speed. As is shown in Table 1, increasing the barrel temperature of the extruder, increasing the screw speed, and increasing the temperature of the R1 reactor were all shown to be effective in increasing the level of terminal olefin groups.

TABLE 1

| Run | R1 (° C.) | Barrel T (° C.) | Screw Speed (RPM) | Olefin (Mole %) |
|-----|-----------|-----------------|-------------------|-----------------|
| 1   | 165       | 270             | 150               | 0.208           |
| 2   | 165       | 200             | 150               | 0.085           |
| 3   | 165       | 200             | 200               | 0.254           |
| 4   | 170       | 270             | 150               | 0.314           |

R1 = Reactor Temperature, Olefin = Concentration of isosorbide-derived olefin

It should be noted that under all process conditions to date, terminal olefin groups have never been detected in the oligomer in continuous stir tank reactors, but that detectable levels of terminal olefin groups have been observed in all isosorbide polymer pellets made to date in this commercial-scale melt transesterification process. Without being bound by theory, it is believed that the longer residence times, especially at higher temperatures, typically associated with such commercial-scale melt polymerization operations makes them well-suited for the preparation of terminal olefin groups.

Example 4

Derivatization of Terminal Olefin Groups

A sample of an isosorbide homopolymer (10.05 g) containing terminal isosorbide units (0.00028 mol %) was dried in a vacuum oven for 2 hours at 100° C. to remove all water, then dissolved in chloroform, and the solution degassed for 1 hour by flushing with $N_2$. The entire subsequent processes were performed under a $N_2$ atmosphere. Next, 0.000052 mole of the radical initiator AIBN was added to the solution, and the solution heated to 50° C. and maintained at that temperature over the remainder of the process. Styrene monomer, 0.00011 moles, was then dissolved in chloroform and then slowly added to the solution over 15 minutes. The slow rate of styrene addition was done to promote grafting of the styrene onto the polycarbonate backbone to provide chain extension and avoid polymerizing to form a polystyrene homopolymer. The chain extension reaction was allowed to proceed overnight. After the chain extension step, the resulting mixture was added dropwise to methanol to precipitate the graft copolymer. The resulting copolymer was then dried on a Büchner funnel and further dried under vacuum in a convection oven at 50° C.

Figure 7:
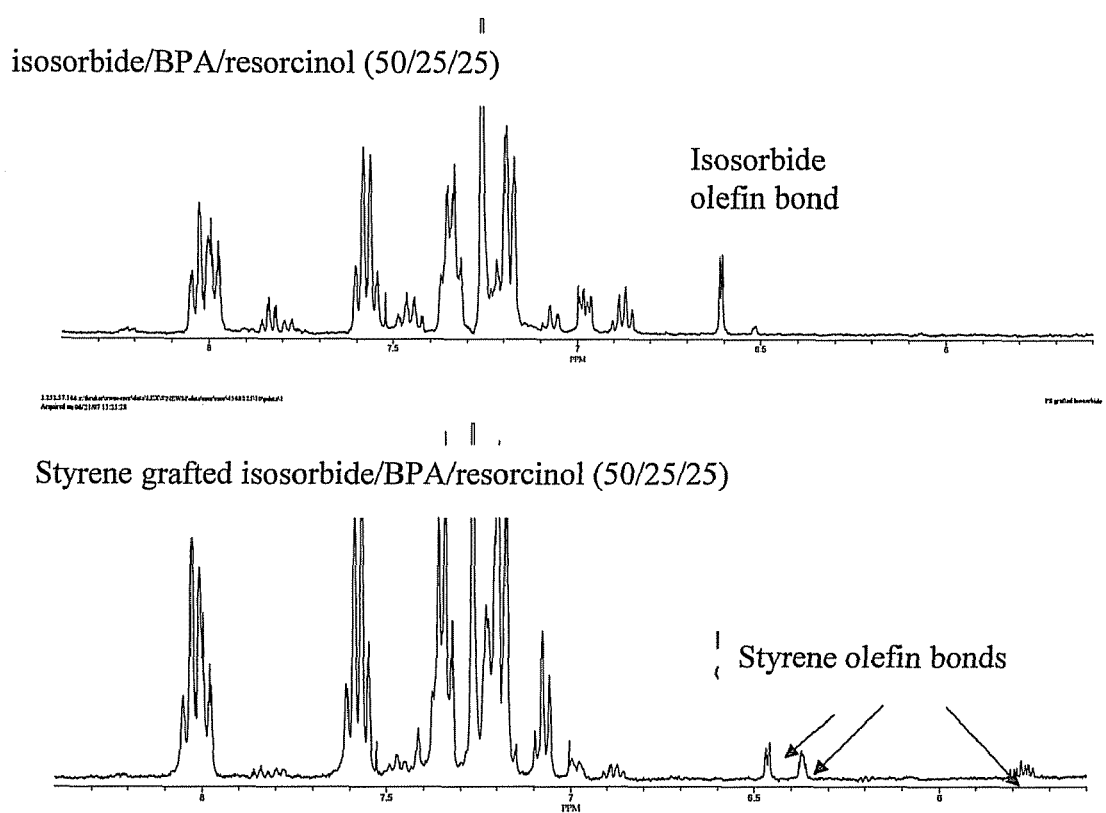
FIG. 7 is a plot of the aromatic region of $^1$H NMR spectra of isosorbide derived homopolymers before and after chain extension with styrene according to Example 5.

$^1$H NMR analysis confirmed that the olefin terminal groups were completely derivatized in the reaction, and new terminal olefin groups were formed in the grafted copolymer. FIG. 7 shows the aromatic region (5.5 ppm to 8.5 ppm) of $^1$H NMR spectra of the isosorbide homopolymer and styrene grafted homopolymer. Indicated on the spectra are proton resonances assignable to the olefin termination in the isosorbide homopolymer and in styrene grafted to the isosorbide homopolymer, respectively. While not wanting to be bound by theory, the new olefin groups are believed to be terminal olefin groups on the grafted polystyrene chains resulting from the termination reactions of the styrene by radical polymerization. The absence of the isosorbide-derived peak at 8.6 ppm in the NMR spectrum of the styrene-grafted isosorbide homopolymer further indicates its conversion. Comparison of the $^1$H NMR features with literature values for free styrene monomer confirms that the new features in the grafted copolymer are not due to free styrene monomer.

Figure 8:
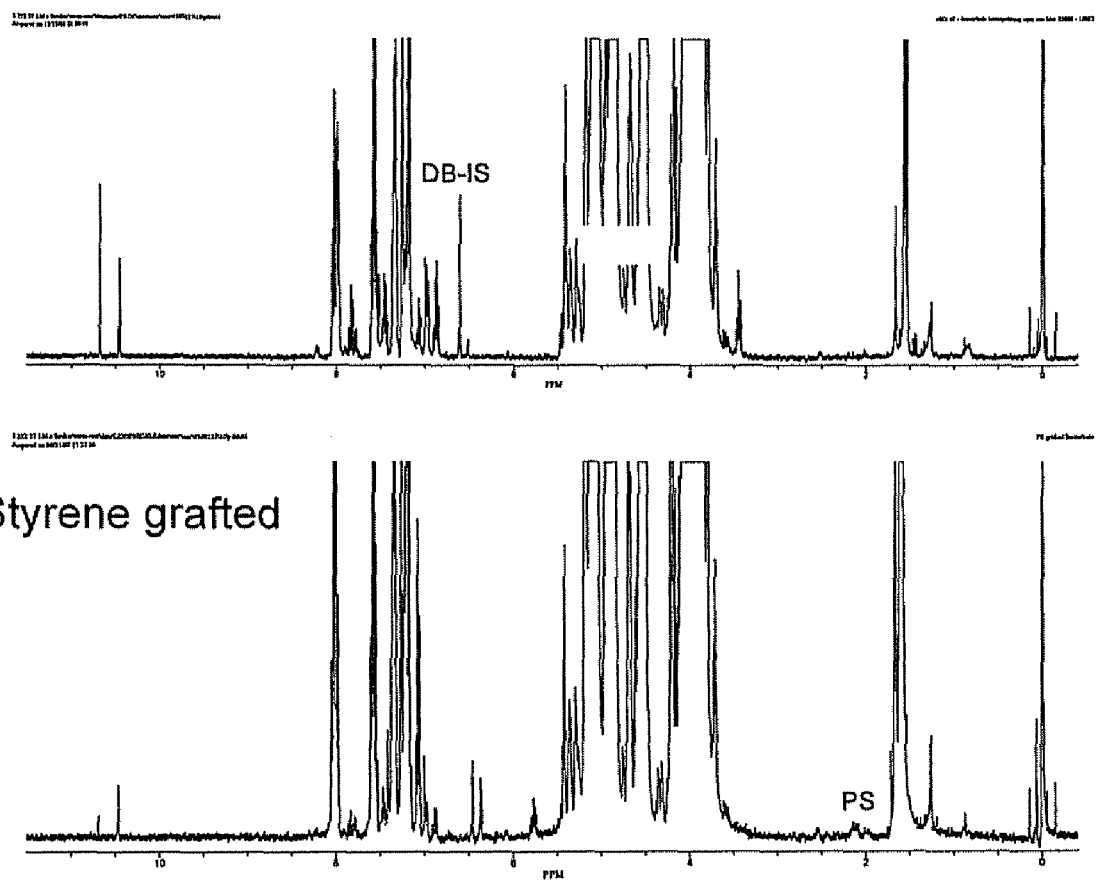
FIG. 8 is a plot of $^1$H NMR spectra of isosorbide-based homopolymers before and after chain extension with styrene according to Example 5.

NMR analysis also supports the formation of the grafted polystyrene chains onto the isosorbide homopolymer. FIG. 8 is the $^1$H NMR spectra of the isosorbide homopolymer and styrene-grafted isosorbide homopolymer between −0.2 ppm and 10.5 ppm. Indicated on the spectra are resonances assignable to olefin termination in the isosorbide homopolymer and polystyrene, respectively. The absence of the resonance at 6.6 ppm observable in the spectrum of the isosorbide homopolymer but not in the spectrum of the styrene grafted product further supports reaction of the isosorbide moiety with styrene.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to 25 wt %, or, more specifically, 5 wt % to 20 wt %," is inclusive of the endpoints and all intermediate values of the ranges of "about 5 wt % to 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an allyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). A wavy bon in a formula indicates that the stereochemistry of the bond is undefined.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate, wherein the polycarbonate comprises a terminal olefin group of the formula

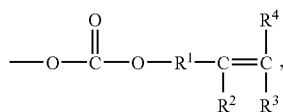

wherein
$R^1$ is a $C_1$-$C_{40}$ hydrocarbon that can be unsubstituted or substituted with a halogen, olefin, ether, or a $C_4$-$C_{30}$ polyoxyalkylene functionality in which the alkylene groups contain 2 to 6 carbon atoms, and
$R^2$ to $R^4$ are each independently a hydrogen or a $C_1$-$C_{40}$ hydrocarbon that can be unsubstituted or substituted with halogen, olefin, ether, or $C_4$-$C_{30}$ polyoxyalkylene functionality in which the alkylene groups contain 2 to 6 carbon atoms,
optionally wherein any two of $R^1$ to $R^4$ together form a monocyclic, bicyclic, or tricyclic ring system optionally substituted with a heteroatom in the ring; and
wherein the polycarbonate comprising the terminal olefin group is the reaction product of a carbonate and a compound of the formula

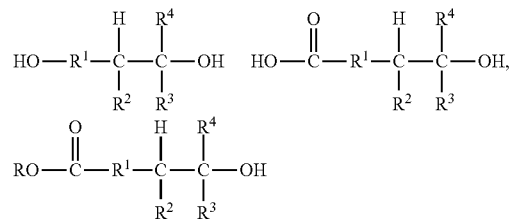

or a combination comprising at least one of the foregoing formulas at a temperature and for a time effective to form the terminal olefin group.

2. The polycarbonate of claim 1, wherein $R^2$ and $R^3$ are each a hydrogen.

3. The polycarbonate of claim 1, wherein $R^3$ and $R^4$ are each a hydrogen.

4. The polycarbonate of claim 1, wherein $R^1$ and $R^4$ together form a monocyclic, bicyclic, or tricyclic group optionally substituted with a sulfur, nitrogen, oxygen, or a combination comprising at least one of the foregoing atoms.

5. The polycarbonate of claim 1, wherein $R^1$ and $R^4$ together form a bicyclic ring system wherein each ring is substituted with one oxygen atom, and $R^2$ and $R^3$ are each a hydrogen.

6. The polycarbonate of claim 1, wherein
$R^1$ is a $C_1$-$C_{40}$ alkylene, $C_3$-$C_{30}$ cycloalkylene, $C_6$-$C_{30}$ arylene, $C_2$-$C_{30}$ alkenylene, $C_7$-$C_{30}$ arylalkylene, $C_7$-$C_{30}$ alkylarylene, or $C_8$-$C_{30}$ arylalkenylene, and
$R^2$ to $R^4$ are each independently a hydrogen, $C_1$-$C_{20}$ alkyl, $C_3$-$C_8$ cycloalkyl, $C_6$-$C_{12}$ aryl, $C_2$-$C_{12}$ alkenyl, $C_7$-$C_{13}$ arylalkyl, $C_7$-$C_{13}$ alkylaryl, or $C_8$-$C_{12}$ arylalkenyl.

7. The polycarbonate of claim 6, wherein
$R^1$ is a $C_1$-$C_{40}$ alkylene, and
$R^2$ to $R^4$ are each independently a hydrogen, $C_1$-$C_{20}$ alkyl, or $C_2$-$C_{12}$ alkenyl.

8. The polycarbonate of claim 7, wherein $R^2$ and $R^3$ are each a hydrogen, or $R^3$ and $R^4$ are each a hydrogen.

9. The polycarbonate of claim 1, wherein the polycarbonate comprises 0.01 mole % to 5 mole % of the terminal olefin groups.

10. The polycarbonate of claim 1, where the polycarbonate comprises carbonate units derived from isosorbide.

11. The polycarbonate of claim 1, wherein the polycarbonate comprises carbonate units derived from bisphenol A and/or resorcinol.

12. The polycarbonate of claim 1, further comprising ester units of the formula

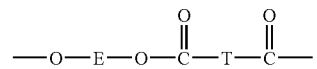

wherein E is a $C_{2-60}$ alkylene, a $C_{6-20}$ cycloalkylene, a $C_{6-20}$ arylene, or a $C_4$-$C_{30}$ polyoxyalkylene in which the alkylene groups contain 2 to 6 carbon atoms, and T is a $C_{2-60}$ alkylene, a $C_{6-20}$ cycloalkylene, a $C_{6-20}$ alkylarylene, or a $C_{6-20}$ arylene.

13. The polycarbonate of claim 12, wherein T is of the formula

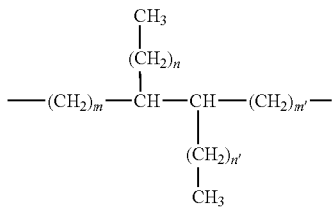

wherein m and m' are independently 0 to 38, n and n' are independently 0 to 38, and the sum of (m +m'+n +n') is 8 to 38.

14. A polycarbonate that is the reaction product of the polycarbonate comprising the terminal olefin group of claim 1 with a reactive agent to form a terminal group of the formula

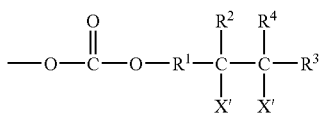

wherein each X' is independently a polymer, an oligomer, a compatibilizer, a crosslinker, an ultraviolet light stabilizer, a thermal stabilizer, a mold release agent, a gamma-stabilizer, a flame retardant, or an antioxidant, and one X' is optionally a hydrogen.

15. An article comprising the polycarbonate of claim 14.

16. A thermoplastic composition comprising the polycarbonate of claim 14.

17. A method for the manufacture of an olefin group-terminated polycarbonate, the method comprising:

melt reacting a carbonate and a compound of the formula:

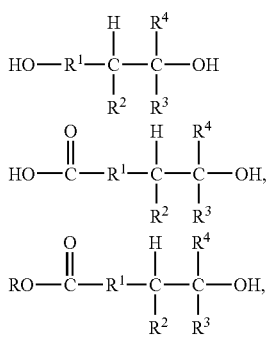

or a combination comprising at least one compound of the foregoing formulas, wherein $R^1$ is a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, $R^2$ to $R^4$ are each independently a hydrogen or a $C_1$-$C_{40}$ hydrocarbon that can be unsubstituted or substituted with a halogen, olefin, ether, or $C_4$-$C_{30}$ polyoxyalkylene functionality in which the alkylene groups contain 2 to 6 carbon atoms, R is a $C_{1-22}$ hydrocarbon, and optionally wherein any two of $R^1$ to $R^4$ together form a monocyclic, bicyclic, or tricyclic ring system optionally substituted with a heteroatom in the ring, at a temperature and for a time effective to form the olefin group-terminated polycarbonate.

18. The method of claim 17, wherein the melt reacting is at a temperature greater than 210° C.

19. The method of claim 17, wherein the melt reacting is by an extrusion, melt mixing, injection molding, or compression molding process.

20. The method of claim 17, wherein the $^1$H NMR spectrum of the olefin group-terminated polycarbonate comprises a broad NMR resonance centered at a chemical shift of between 6.4 ppm and 6.6 ppm and wherein the resonance is absent in the $^1$H NMR spectrum of the polycarbonate.

21. The method of claim 17, wherein $R^2$ and $R^3$ are each a hydrogen.

22. The method of claim 17, wherein $R^3$ and $R^4$ are each a hydrogen.

23. The method of claim 17, wherein $R^1$ and $R^4$ together form a monocyclic, bicyclic, or tricyclic group optionally substituted with a sulfur, nitrogen, oxygen, or a combination comprising at least one of the foregoing atoms.

24. The method of claim 17, wherein $R^1$ and $R^4$ together form a bicyclic ring system wherein each ring is substituted with one oxygen atom, and $R^2$ and $R^3$ are each a hydrogen.

25. The method of claim 17, wherein $R^1$ is a $C_1$-$C_{40}$ alkylene, $C_3$-$C_{30}$ cycloalkylene, $C_6$-$C_{30}$ arylene, $C_2$-$C_{30}$ alkenylene, $C_7$-$C_{30}$ arylalkylene, $C_7$-$C_{30}$ alkylarylene, or $C_8$-$C_{30}$ arylalkenylene, and $R^2$ to $R^4$ are each independently a hydrogen, $C_1$-$C_{20}$ alkyl, $C_3$-$C_8$ cycloalkyl, $C_6$-$C_{12}$ aryl, $C_2$-$C_{12}$ alkenyl, $C_7$-$C_{13}$ arylalkyl, $C_7$-$C_{13}$ alkylaryl, or $C_8$-$C_{12}$ arylalkenyl.

26. The method of claim 25, wherein $R^1$ is a $C_1$-$C_{40}$ alkylene, and $R^2$ to $R^4$ are each independently a hydrogen, $C_1$-$C_{20}$ alkyl, or $C_2$-$C_{12}$ alkenyl.

27. The method of claim 26, wherein $R^2$ and $R^3$ are each a hydrogen, or $R^3$ and $R^4$ are each a hydrogen.

28. The method of claim 17, wherein the polycarbonate comprises 0.01 mole % to 5 mole % of the terminal olefin groups.

29. The method of claim 17, wherein the compound or compounds of the formula:

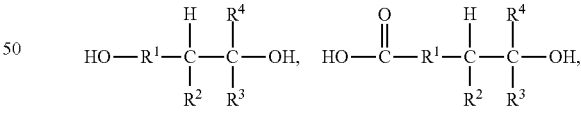

or

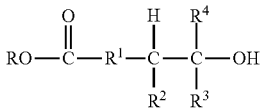

reacts with a carbonate group on a previously polymerized polycarbonate.

30. The method of claim 17, further comprising reacting a terminal olefin group of the olefin-terminated polycarbonate with a reactive agent that is a polymer, an oligomer, a compatibilizer, a crosslinker, an ultraviolet light stabilizer, a thermal stabilizer, a mold release agent, a gamma-stabilizer, a flame retardant, or an antioxidant.

31. The method of claim 17, further comprising reacting a terminal olefin group of the olefin-terminated polycarbonate with a reactive agent to form a terminal group of the formula

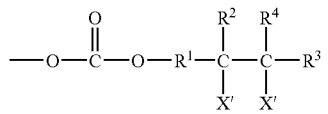

wherein each X' is independently a polymer, an oligomer, a compatibilizer, a crosslinker, an ultraviolet light stabilizer, a thermal stabilizer, a mold release agent, a gamma-stabilizer, a flame retardant, or an antioxidant, and one X' is optionally a hydrogen.

32. The polycarbonate of claim 14, wherein one X' is a crosslinker.

* * * * *